United States Patent [19]

Keiper

[11] E Re. 28,615

[45] Reissued Nov. 18, 1975

[54] HYDROFOIL SAILING CRAFT

[76] Inventor: David A. Keiper, P.O. Box 71, Sausalito, Calif. 94965

[22] Filed: Feb. 7, 1973

[21] Appl. No.: 330,201

Related U.S. Patent Documents

Reissue of:

[64] Patent No.: 3,561,388
Issued: Feb. 9, 1971
Appl. No.: 822,578
Filed: May 7, 1969

[52] U.S. Cl. ..... 114/66.5 H
[51] Int. Cl.[2] ..... B63B 1/28
[58] Field of Search ..... 114/66.5 H, 66.5 F, 61

[56] References Cited

UNITED STATES PATENTS

| | | | |
|---|---|---|---|
| 2,856,879 | 10/1958 | Baker | 114/66.5 H |
| 2,991,747 | 7/1961 | Bader et al. | 114/66.5 H |
| 3,077,850 | 2/1963 | Beuby | 114/66.5 |
| 3,179,078 | 4/1965 | Popkin | 114/66.5 H |
| 3,191,567 | 6/1965 | Ask | 114/66.5 H |
| 3,230,918 | 1/1966 | Compton | 114/66.5 H |
| 3,286,673 | 11/1966 | Nason | 114/66.5 H |
| 3,354,857 | 11/1967 | Hobnay | 114/66.5 H |
| 3,357,389 | 12/1967 | Wray, Jr. | 114/66.5 H |

*Primary Examiner*—Trygve M. Blix
*Assistant Examiner*—Stuart M. Goldstein

[57] ABSTRACT

A hydrofoil trimaran, adapted to be supported wholly by hydrofoils with sail propulsion means, comprising a bow hydrofoil truss structure having a symmetrically disposed dihedral foil element with oppositely inclined lifting surfaces pivotally mounted upon the opposite sides of the central hull and the pontoon hulls above the normal waterline of said hulls on a substantially common pivotal axis with means for securing the truss structure in a generally vertical plane with lifting surfaces inclined to provide a positive angle of attack and positive lift, lateral hydrofoil units applied to each of the pontoon hulls, having lifting foils inclined outwardly and upwardly, and laterally of the center of thrust of the sail propulsion means and a stern foil unit lifting foils, adapted to act as a rudder, and means for retracting all hydrofoils for normal sailing.

12 Claims, 11 Drawing Figures

INVENTOR.
DAVID A. KEIPER.

BY

ATTORNEY

INVENTOR.
DAVID A. KEIPER.

BY

ATTORNEY

INVENTOR.
DAVID A. KEIPER.
BY
ATTORNEY

INVENTOR.
DAVID A. KEIPER.

BY

A. P. Keiper

ATTORNEY

INVENTOR.
DAVID A. KEIPER

BY

ATTORNEY

HYDROFOIL SAILING CRAFT

Matter enclosed in heavy brackets [ ] appears in the original patent but forms no part of this reissue specification; matter printed in italics indicates the additions made by reissue.

This invention relates to hydrofoil sailing craft.

More specifically, the invention contemplates a practical, troublefree hydrofoil configuration, especially suited to a modified multihull sailing craft. It provides means for retracting the hydrofoils for sailing in light winds, shallow or crowded waters, or for docking the craft. The invention comprises a novel fixed foil configuration which allows both high speed and comfort in a sailing yacht, even in rough waters.

In unprotected waters, a hydrofoil sailing yacht must cope with large and variable heeling forces from its sails, as well as sizable changes in water flow direction and velocity over its hydrofoils during wave encounter. The craft must be able to surmount a drag hump to become fully foilborne, and must do this in moderate wind velocities.

For becoming foilborne in moderate winds, there is required a highly efficient hydrofoil system, efficient sail rig, and overall lightweight of the craft. In fact, the craft preferably should be as light as the lightest of racing multihull yachts. For the craft to operate for extended periods of time, such as offshore, without trouble, moving parts within its foil system should be avoided. The foils themselves should be extremely sturdy, and well fastened to a rigid hull structure. With fixed foils that must supply widely varying forces for stabilization over a wide speed range, the foils should be of the surface piercing variety. For efficiency, high aspect ratio and deep submergence are highly desirable. On a daysailer or small size cruising yacht, this would involve using a fairly short blade chord length, of the order of 3 to 6 inches, limited on the lower side by necessary fore and aft rigidity of the foil units and by the economics of joining or welding together complex structures. The foil units preferably should embrace truss structures, for both strength and light weight, since this from minimizes stresses at the places where blading and struts join together.

For the craft to take off in roughish waters under moderate wind conditions slender hulls allowing low drag and having excellent initial lateral stability are preferable. Such slender hulls also make for easy water reentry when the wind drops or when the foils lose stability temporarily. The hull cross section may be such that it is a displacement shape at low speed, becoming more of a planing shape as it lifts. Also, stability of a lightweight hydrofoil craft under extreme sail side forces is improved by a craft of considerable width. Multihull configurations such as the catamaran or trimaran appear best. The hulls provide convenient structural fastening points for the hydrofoil units, without having the foils supported on slender arms as heretofor. The considerable overall width of the hulls helps to allow rigging weight to be kept low with reasonable stresses in spite of the extreme sail side forces generated at high speed.

Hydrofoil sailing craft have used a three-foil system. In a three-foil symmetric system, one foil unit is burdened heavily, supplying both lateral stabilizing forces and longitudinal stabilization against sail forward pitching moments and wave encounter. One cannot maximize both longitudinal and lateral stability. In the present invention, a four-foil symmetric system is used which acts as a three-foil asymmetric system when the craft heels a moderate amount from the sail forces. In coming about, no readjustments are needed, since heel in the other lateral direction effectively switches the system over. What is more, the fourth foil, normally airborne on the windward side of the craft, can help to protect the craft from a serious high speed crash drive if the bow foil loses lift through wave action. As the bow foil loses lift and starts dropping, the airborne windward lateral foil comes into action to give necessary support. The lateral foils and stern foil combination stabilizes the craft with a longitudinal trim angle which is only a few degrees lower than normal trim using the bow foil. That is, the stern and lateral foils provide a longitudinal righting couple to prevent the craft from taking a steep dive, giving the bow foil time to recover its own lifting action, without the boat getting into an irreversible dynamically assisted crash in which negative bow lift generates more negative bow lift, with the craft's momentum quickly producing a stern-over-bow capsize as can occur in a three foil system. If the loaded leeward lateral foil should lose lift through wave action, the craft will heel and spill wind from its sails, thus reducing the heeling force. Slender, buoyant pontoons provide protection from capsize in an extreme case. With bow and stern foil maintaining the craft in proper fore-and-aft trim angle, the leeward lateral foil can recover lift quickly. Essentially, the foil system is able to fail safely.

The bow-stern foil combination controls trim of the craft so as to maintain proper angle of attack on all of the foils as speed changes. At low speed, where foils cannot lift the craft, it is best to have a low angle of attack on all foils, so as to minimize the drag penalty of having the foils at all. As the craft accelerates near the takeoff speed, it is optimal to have high angles of attack on the foils. By having an excess area on the bow foil, the craft can be made to lift its bow as much as 5° or so, so as to put high angles of attack on all foils as takeoff speed approaches. However, the bow foil is preferably maintained at a higher angle of attack than the stern foil, so as to provide longitudinal stability during the takeoff phase. After take off, as speed increases, foil angles of attack are reduced to get maximum efficiency. This may be accomplished by distributing the lifting elements so that the bow foil loses more area than the stern foil as speed increases. This causes the nose of the craft to gradually come down (or rather the stern rises more) to where it is level at the top speed of the craft. The stern foil lifting elements may remain totally submerged through the entire speed range, or else merely come out of the water less than the other foils.

As speed increases relative to the true wind speed, more and mor of the craft's weight is placed on the leeward lateral foil because of the increased sail side forces. The bow-stern foil combination becomes lightly loaded at high speed with tremendous reserve lifting area if necessary, and thus it acts as stable sensors to keep roughly correct angle of attack on the heavily loaded leeward lateral foil. If the entire weight of the craft is temporarily imposed upon the leeward lateral foil, the craft does not tend to capsize laterally, for the sail forward pitching moment causes the craft to aim bow down a few degrees. The craft tends to descend and reenter the water safely.

By use of dihedrals on the lateral foils, leeway of the craft can be fairly well eliminated. Zero leeway occurs when the projections on a transverse lateral plane, of the craft weight vector passing through the center of gravity of the craft, the sail force vector passing through the center of pressure of the sails, and the lift vector of the leeward lateral foil all intersect at a point. To be strictly correct, sidewise windage on the hull and rigging should be combined into the sail force vector. Because the craft of this invention is designed to have a moderate heel, roughly 10° in average conditions, it turns out that the point of intersection of these forces is substantially below the point where the sail center of pressure passes through the center plane of the craft. Also, sidewise windage on multihulls, lifted out of the water, is expected to be considerable, making this point more significantly below. It may be advantageous to place the upper portions of the lateral foil lifting elements at an even higher dihedral, for minimizing leeway when the craft is heeled substantially more than average.

To reduce the possiblity of air entrainment on the foils, with consequent loss of lift, most of the foil elements are given a moderate amount (10° to 15°) of sweep. That is, the elements are directed aft as they come up to emerge through the water's surface [.], *as seen in FIGS. 1–6 and 11 of the drawings.*

A problem which may be serious with the hydrofoil sailing yacht is preventing capsize, such as may occur when the craft is moving slowly very close to the wind and a strong gust of wind arrives which is more broadside. Light weight of the craft, with hydrofoils going deep may contribute to the capsize, since foil drag at low speed may prevent the craft from accelerating as quickly as the typical multihull sailing craft. The very efficient high aspect ratio lateral foils may tend to stall out in the gust situation, and become powerless to prevent capsizing. Several design factors may prevent capsizing, such as mounting low aspect ratio foils of large area laterally, with dihedral, above or around the pontoon waterline. Such foils will resist stalling out, even at high angles of attack. In addition the bottoms of the pontoons may be made relatively flat, with moderate dihedral and with hard chines where the bottom joins the sides, thus increasing reaction against heeling moments when a gust strikes. Outward and upward flare of the outer pontoon sides will help to keep the righting moments positive when the craft is at a 90° heel if the pontoons are extremely buoyant. The weight of metal hydrofoils underneath the craft will add a significant ballasting effect when the craft is at a 90° heel. A masthead float is helpful to prevent the craft from going upside down if it should be knocked over by a gust.

The hull requires a special lightweight construction which preserves rigidity by its shape and proportions. In a modest sized cruising yacht, the trimaran form appears best, whereas in a daysailer, catamaran hulls appear optimum. Rigidity of the hulls can be gotten by using a "stressed" skin construction, whereby flat plywood sheets are given compound curvature by being fastened to lightweight frames alrady set up in position. The hull comprises a shell structure with the loads at the hydrofoil fastening points distributed by special requirements of the hydrofoil craft. The two main differences are: (1) the craft needs extra thrust forwards to surmount the drag hump which occurs just below the speed at which the craft becomes fully foilborne. Sails need to be highly cambered to get maximum lift during the takeoff phase when the apparent wind may be some 45° to 90° off the bow. (2) To reach high speed with cloth sails, the sails should be low cambered, to keep the sails from luffing when the apparent wind is coming in some 15° to 30° off the bow. Also, the high apparent wind velocities require lower lift coefficients (lower camber) to prevent excessive heeling moments. To assist in providing this sail shape change automatically as the sheets are hauled in, the sails are loose-footed and their booms pivot aft of the stays to which the sails are attached. For both conditions, but especially for high speed, there must be a streamlined profile where the sail joins the mast. A rotating, profiled mast may be used.

The hydrofoil yacht offers both high speed and comfort at sea. The craft readily surfs on the fast, moderately sloped, well developed waves, such as would be found in the trade winds. Conventional multihulls generally only surf on the slower, much steeper waves, such as the fresh waves generated during storms.

The above and other novel features of the invention will appear more fully hereinafter from the following detailed description when taken in conjunction with the ccompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1:
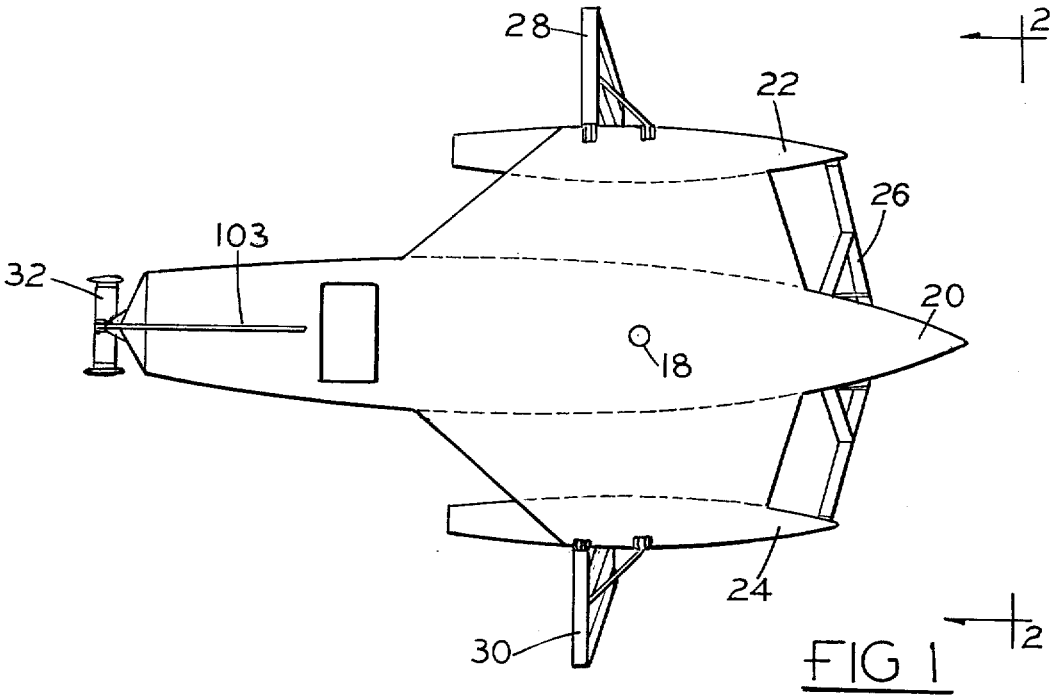
FIG. 1 is a plan view of a trimaran equipped with hydrofoils.

Referring to the drawings there is shown a multihull craft in the form of a trimaran having a main central hull 20 having a mast 18, and a pair of pontoon hulls 22 and 24 disposed on either side and rigidly affixed to the main hull by adequate spars or shell structure as indicated at 21. In multihull craft of this type during normal sailing the pontoons resist the heeling due to sail forces so that heavy keels are rendered unnecessary. In order to provide hydrofoils for such a craft, that may be effective to support the hulls clear of the sea and yet provide sufficient lateral stability, as well as fore and aft control, the invention contemplates a bow hydrofoil assembly 26, port and starboard lateral hydrofoil assemblies 28 and 30 supported by each of the pontoons, and a stern hydrofoil 32 which may serve as a rudder.

Figure 2:
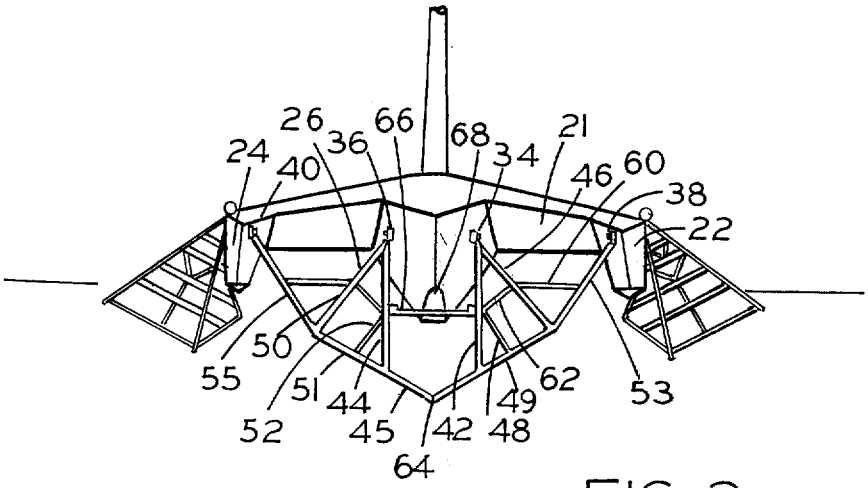
FIG. 2 is a bow elevational view.

The bow hydrofoil assembly 26 is symmetrical with respect to the longitudinal and vertical axis of the craft and is secured to the main hull on opposite sides thereof as at pivot points 34, 36, and similar pivot points 38 and 40 in alignment therewith, located on the inside walls of the pontoons 22 and 24 adjacent the bow ends thereof. The assembly comprises a V-like lifting element 45 supported by vertical struts 42 and 44 on opposite sides of the main hull 20 and inclined struts 46 and 48, 50 and 52, extending laterally from the respective struts 42 and 44 to support the lifting element in the form of a hydrofoil blade 45 of NACA 16–510 section, or other suitable blade section, which for convenience may extend from one pivot point 38 to the other pivot point 40 in a wide V sufficient to extend well below the bottom of the main hull 20, when in the position as indicated in FIG. 2.

The central sections 49 and 51 of such blading may bear an angle to the horizontal of about 30°, and the upper sections 53 and 55 may extend upwards to the pivots 38 and 40 at an angle of about 50°. The struts 46 and 50 extend to the joints between the sections 49 and 51, and 53 and 55, and adequate bracing 60 and 62 is provided to complete a truss structure. The struts and bracing are of thin elongated streamlined section to provide maximum strength and minimum resistance to water flow. The apex 64 of the dihedral formed by the blade sections 49 and 51 is preferably so located with respect to the common axis of the pivots 40, 36, 34 and 38, as to readily clear the bow of the main hull so that the bow hydrofoil may be retracted to a horizontal position wholly above the waterline and clear of the prow as indicated in FIG. 3 at 26'.

Figure 3:
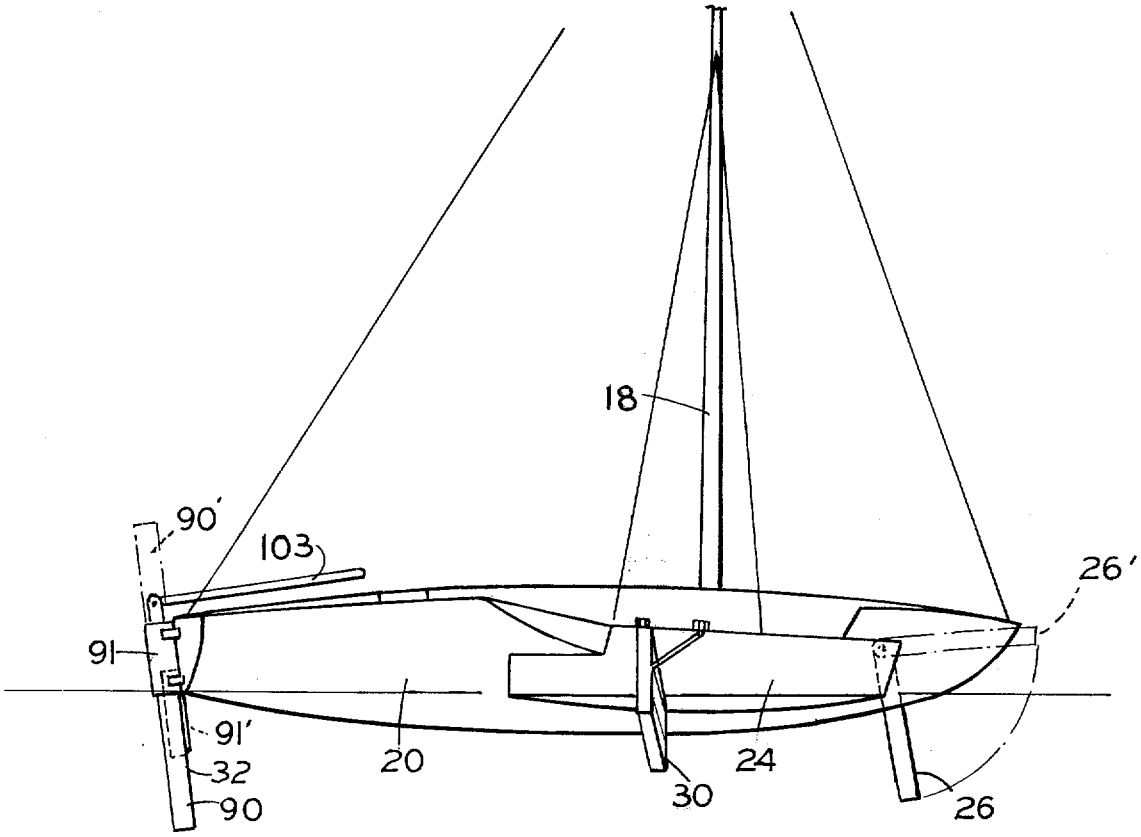
FIG. 3 is a side elevational view.
Figure 4:
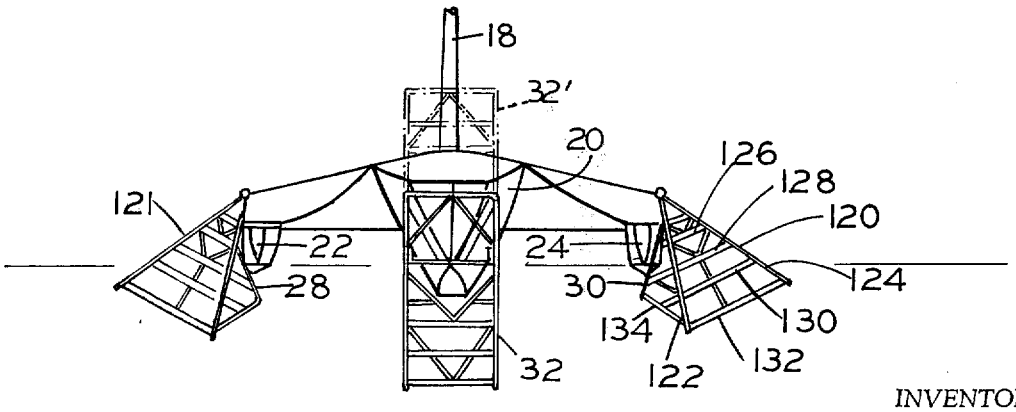
FIG. 4 is a stern elevational view.
Figure 6:
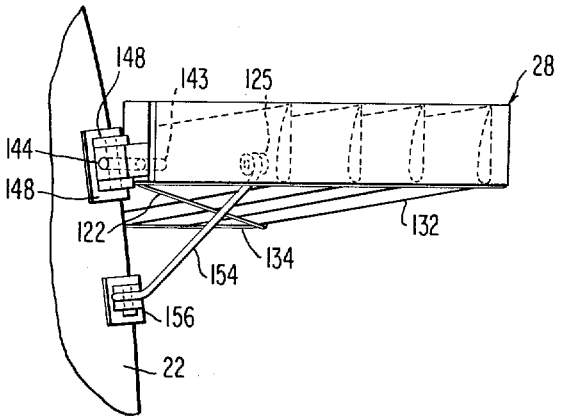
FIG. 6 is a plan view of the port hydrofoil.
Figure 5:
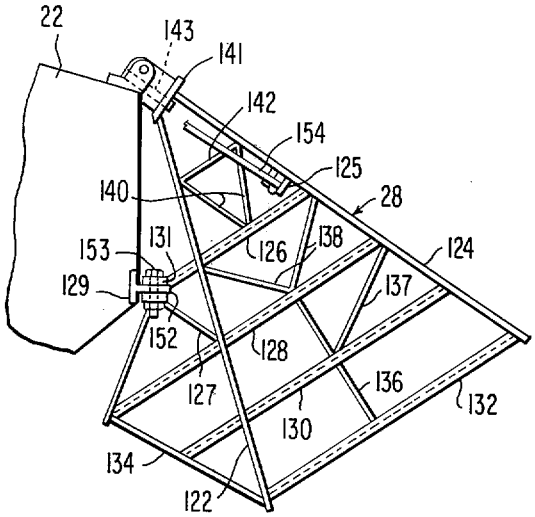
FIG. 5 is a front elevational view of the port hydrofoil.
Figure 7:
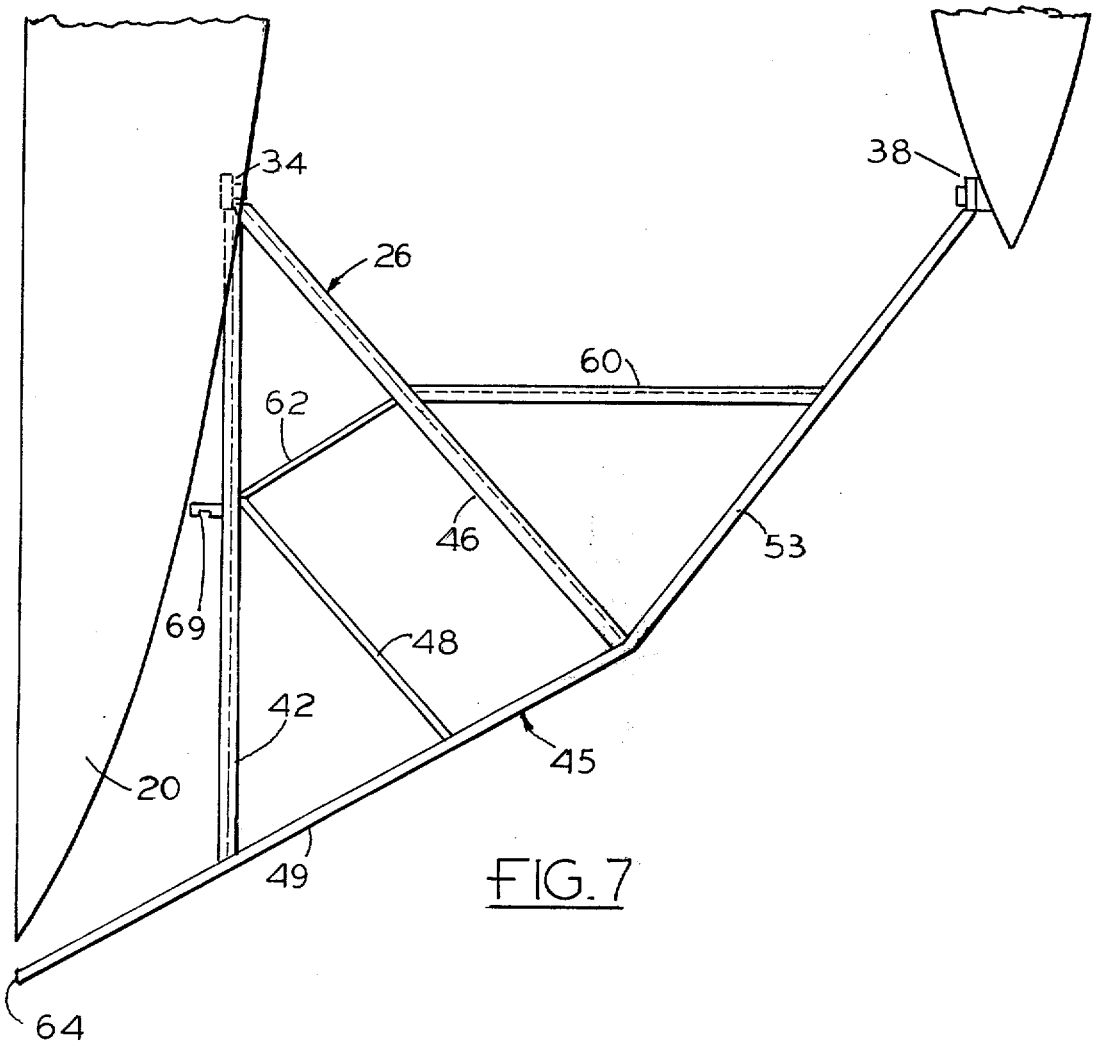
FIG. 7 is a fragmentary plan view of the port side of the bow hydrofoil in retracted position.
Figure 8:
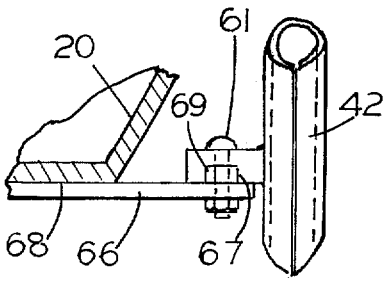
FIG. 8 is a fragmentary detail of the lower lock for one side of the bow hydrofoil when in active position.

In order to hold the bow hydrofoil assembly in active position with the struts 42 and 44 extending downwardly and somewhat forwardly as indicated in FIG. 3, there is provided a transverse brace 66, affixed to the scow bottom 68 of the center hull 20, the brace having at its ends a fitting adapted to engage or be affixed to the struts 42 and 44 to securely hold the struts in the active position. Such fitting may comprise an interengaging tongue 67 and groove 69 as shown in FIG. 8 to resist lateral forces, and a shear pin 61 or other form of lock to resist fore and aft movement. A shear pin on either side is provided to protect the craft against damage should a heavy floating obstruction be encountered by the bow hydrofoil assembly. The shear pins may be manually set in place upon lowering the bow assembly to its effective position, or if desired, such shear pins may be actuated by suitable control rods or cables (not shown) extending to a convenient point near deck level and above the waterline.

It will be seen from FIG. 3 that the bow hydrofoil blading sweeps forwardly and downwardly by about 10°. When the structure is in the active position shown, the blading will have an angle of attack of about 5°.

The stern hydrofoil assembly comprises a rigid swivel frame 71 having an upper channel member 70 and a lower transverse member 72 pivoted centrally in upper and lower gudgeons 74 and 76 affixed centrally as at 78 to the split transom of the main hull 20. Such members 70 and 72 are diagonally braced by channels 80 and struts 82. Each member 70 and 72 is provided with upstanding ears 84 and 86 on its ends. Pivotally secured to the ears 86 of the lower member 72 as by bolts at 87 are streamlined sectioned frame members 88 and 90 which also serve as rudder blades. Such blades have enlarged portions 89 and 91 extending upwardly past the ears 84 of the member 70 to which such portions may be secured by shear bolts 85, passing through suitable apertures provided therefor. A plurality of apertures may be provided therefor. A plurality of apertures may be provided in each of the ears 84 and disposed on an arc centered on the bolts 87, to permit alteration of the angle of attack of the stern foil lifting blades. The lower ends of the vertical rudder blades 88 and 90 are provided with transverse hydrofoil or lifting blades 92, 94 and 96 of aerofoil section such as NACA 16–510.

Such blades are braced by diagonal struts 98 and 97, and stiffeners 100 and 102, all of streamline section, to provide a rigid stern hydrofoil structure together with the swivel frame 71, when the hydrofoil blades are disposed in operative position as shown in FIG. 3. When in such operative position, the vertical blades 88 and 90, which serve as a rudder, are preferably forwardly swept as indicated, and the hydrofoil blades 92, 94 and 96 may have an angle of attack of about 0°, which may be varied by employing different apertures in placing the shear bolts 85.

Figure 10:
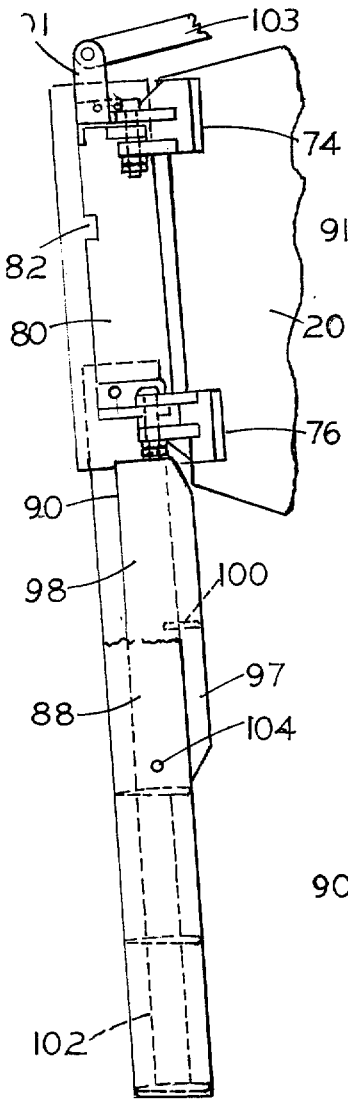
FIG. 10 is a side view of the rudder hydrofoil with parts cut away.
Figure 9:
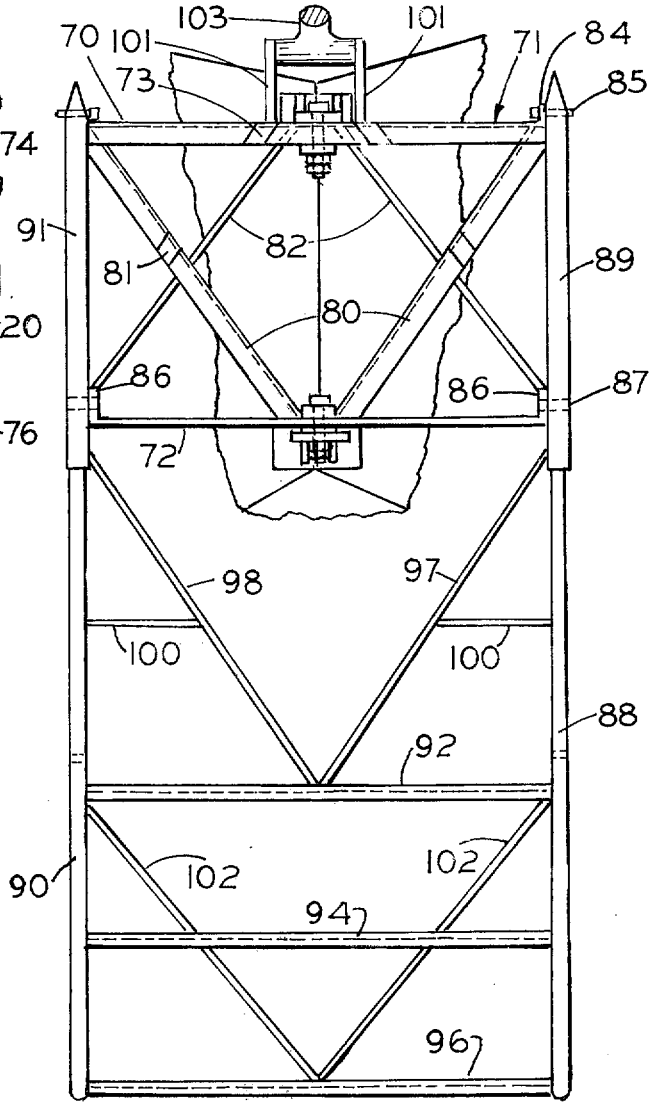
FIG. 9 is a rear view of he rudder hydrofoil.

The upper channel 70 may be provided with upstanding ears 101 to receive a tiller 103, or other suitable gear for steering the swivel frame 71 may be provided. The spacing between the upper portions 89 and 91 of the blades 88 and 90 are such that, upon removal of the shear bolts 85, the lower portion of the stern hydrofoil assembly may be swung rearwardly and upwardly to a vertical position out of the water, with the upper portions 89 and 91 of the blades 88 and 90 swinging clear of the hull sidewalls in being swung forwardly and downwardly to a depending position where such portions may serve as a rudder during normal sailing. The channel braces 80 and member 70 are notched as at 81 and 73 respectively to receive the diagonal struts 97 and 98, and apertures 104 in the side blades are provided to align with the apertures in the ears 84 so as to receive the shear bolts 85, and thus hold the hydrofoil structure in an upstanding retracted position, while the free ends 89 and 91 of the blades 88 and 90 extend well below the waterline to act as rudder means as is indicated at 91' in FIG. 3. Since the portions 89 and 91 of the blades 88 and 90 are of shorter length, such blades are preferably made wider as indicated to render them more effective as a rudder. Such blades 89 and 91 preferably will not extend into the water a distance greater than the draft of the main hull 20. To facilitate the positioning of the stern hydrofoil assembly in the inactive position, and nested in the frame 71, the pivotal center of bolts 87 may be disposed rearwardly of the ears 86 of the frame 71 as indicated in FIG. 10, and the bracing 97 and 98 may be offset forwardly as also indicated in FIG. 10 so that the notches 81 and 73 may be shallow and avoid weakening the structure.

The lateral hydrofoil assemblies 28 and 30, being left and right, or mirror images of each other, a description of one will suffice herein. The lateral hydrofoil 28 comprises divergent struts 122 and 124 of streamline section to which are affixed hydrofoil blades 126, 128, 130 and 132 of suitable section, again such as NACA 16–510. The blades 128 and 130 extend inwardly of the strut 122, and their ends are rigidified by a tie member 134. Suitable bracing as at 136, 137, 138, 140 and 142 rigidifies the structure. The upper end of the struts 122 and 124 terminate in a plate 141 that is swiveled on a heavy pivot stud 143, extending through a knuckle block 144. The knuckle block 144 is pivoted in a deck fitting 148 with the pivot axis disposed above and outboard of the deck edge of the pontoon hull 22. The pivot axis extends at an angle inclined to the fore and aft axis of the craft.

Figure 11:
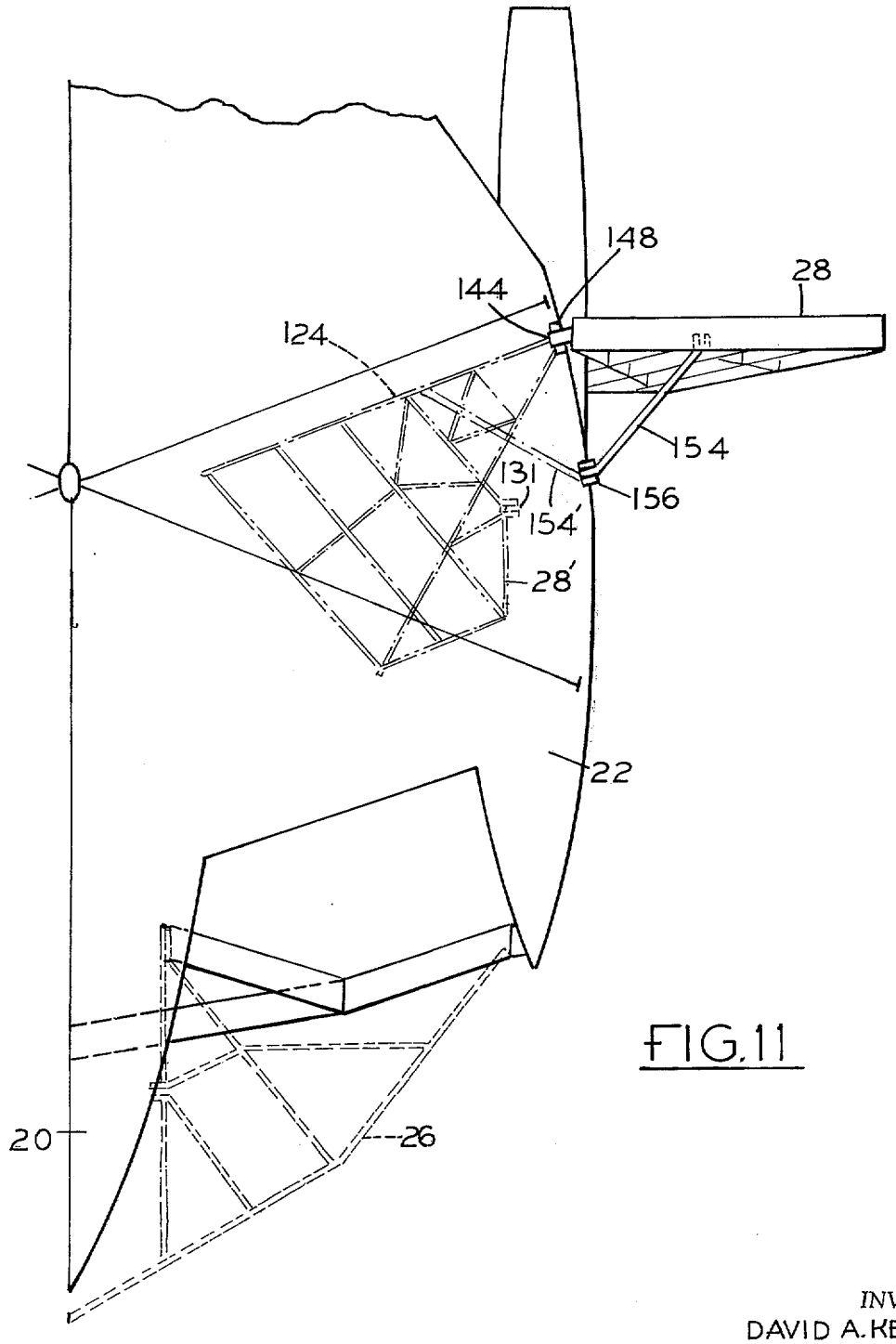
FIG. 11 is a schematic plan view showing the location of a half of the bow hydrofoil and a side hydrofoil in active position with retracted positions indicated.

The upper blade 126, at its inner end is braced as at 127 and provided with spaced jaws 131 adapted to interengage with and receive a tonguelike fitting 129 rigidly secured to the pontoon at a point near the waterline as at 152 and be secured by a removable bolt 153, to form a rigid connection therebetween. A diagonal brace 154 is pivotally secured at its forward end to a fitting 156, affixed to the pontoon hull deck. The pivotal axis in the fitting 156 is aligned with the axis of fitting 148. The brace extends to the strut 124 at a point above but adjacent to the blade 126 and is pivoted as at 125 to the strut on an axis coincident with the pivot axis of stud 143. The mounting of the foil assembly on the pivot axes in the fittings 148 and 154, and 144 and 125 is such as to permit the assembly to be retracted from the water and swung over the deck, after which the assembly pivots around the axis of the stud 143 and brace pivot 125 to a retracted position lying on the deck, in the approximate position indicated at 28' in the approximate position indicated at 28' in FIG. 11 all without interference with shrouding necessary to sailing craft.

As in the case of the bow and stern assemblies, the lateral hydrofoil elements preferably have forward and downward sweep as indicated. In addition, as with the bow assembly, the lateral hydrofoil sections of the blading are provided with an angle of attach of about 5°.

The hydrofoils above described are preferably formed from streamlined alumininum alloy or other lightweight metal sections or extrusions or hollow stainless steel sections all suitably welded, into a rigid trusslike structure. While there are disclosed specific truss structures found to be effective, it should be understood that the blading and support structure may take many forms.

While one form of the invention has been illustrated and described, it is to be understood that the invention is no limited thereto. As various changes in the construction and arrangement may be made without departing from the spirit of the invention, as will be apparent to those skilled in the art, reference will be had to the appended claims for a definition of the limits of the invention.

I claim:

1. In a hydrofoil trimaran, a central hull and a pair of pontoon hulls symmetrically disposed on opposite sides of the central hull and spaced therefrom and sail propulsion means, a bow hydrofoil truss structure having a symmetrically disposed dihedral foil element with oppositely inclined lifting surfaces, with strut means, said structure being pivotally mounted upon the opposite sides of the central hull and the pontoon hulls above the normal water line of said hulls on a substantially common pivotal axis, means for securing the truss structure in a generally vertical plane with lifting surfaces inclined to provide a positive angle of attack and positive lift, a lateral hydrofoil unit applied to each of the pontoon hulls, having lifting foils inclined outwardly and upwardly, and laterally of the center of thrust of the sail propulsion means, and a stern foil unit having lifting foils.

2. A trimaran as set forth in claim 1 wherein the stern foil unit includes steering elements.

3. A trimaran as set forth in claim 1 wherein the lateral hydrofoil units are secured to the pontoon hulls at three points.

4. A trimaran as set forth in claim 1, wherein the bow hydrofoil is retractable to a position above the waterline.

5. A trimaran as set forth in claim 3, wherein the lateral units are secured to the pontoon hulls on a pivotal axis extending generally fore and aft at two of the points, and each unit is retractable by movement about said axis upon disconnecting the unit from its third point.

6. A trimaran as set forth in claim 1 wherein the foil elements are of a NACA 16–510 section.

7. A combination rudder and stern hydrofoil for a water craft comprising a rectangular frame having transverse members adapted to be pivoted centrally in gudgeons at the stern of a water craft, and having spaced side members extending substantially vertical, a pair of rudder blades, each having a pivotal connection to the frame side members on either side of the frame, and each blade having a first rudder blade portion for normal displacement navigation extending to one side of the pivotal connection a sufficient distance so as to act as rudder blades when extending downwardly from said pivot and into and below the waterline, and a second rudder blade portion extending from the other side of said pivotal connection a greater length than said first named portions, transverse hydrofoil means connecting said second rudder blade portions, said hydrofoil means and second portions being adapted to lift the stern of a water craft when underway and when extending downwardly from the pivotal connections, and projecting below the waterline, and means for locking the blades to the frame with first named portions extending below the waterline or the second named portions extending below the waterline.

8. A rudder and stern hydrofoil as set forth in claim 7. wherein the spacing between the blades is such as to permit the first blade portions to clear the stern of a water craft to which the rectangular frame is attached.

*9. A trimaran as set forth in claim 1 wherein the lateral hydrofoil units and the foils thereof are provided with sweep in the order of 10° to 15° directed aft as the foils come up to emerge through the water's surface.*

*10. A trimaran as set forth in claim 1 wherein the lifting surfaces of the bow hydrofoil truss structure have sweep in the order of 10° to 15° directed aft as the lifting surfaces come up to emerge through the water's surface.*

*11. A trimaran as set forth in claim 1 wherein the lateral hydrofoil units and the foils thereof, and the lifting surfaces of the bow hydrofoil truss structure have sweep in the order of 10° to 15° directed aft as the foils and lifting surfaces come up to emerge through the water's surface.*

*12. In a multi-hull sailing vessel having sail propulsion means, and having spaced pontoon hulls, a lateral hydrofoil unit applied to each pontoon having foils inclined outwardly and upwardly and laterally of the center of thrust of the sail propulsion means, and wherein the units, and the foils thereof have sweep in the order of 10° to 15° directed aft as the foils come up to emerge through the water's surface, wherein the units are secured to the pontoon hulls at three points, and wherein each of the lateral units are pivotally secured to the hulls at two spaced points disposed on a pivotal axis extending generally fore and aft, and each unit is retractable by movement about said axis upon disconnecting the unit from a third point.*

* * * * *